United States Patent [19]
Zoche et al.

[11] Patent Number: 6,031,312
[45] Date of Patent: Feb. 29, 2000

[54] SQUIRREL CAGE ROTOR

[75] Inventors: Michael Zoche; Georg Zoche; Bernhard Krasser, all of Munich, Germany

[73] Assignee: Michael Zoche Antriebstechnik, Munich, Germany

[21] Appl. No.: 09/299,313

[22] Filed: Apr. 26, 1999

[30] Foreign Application Priority Data

Apr. 27, 1998 [DE] Germany .......................... 198 18 774

[51] Int. Cl.$^7$ .................................................. H02K 17/16
[52] U.S. Cl. ........................... 310/211; 310/216; 29/598; 29/609
[58] Field of Search .................................. 310/211, 216, 310/179, 261, 262, 265; 29/598, 609

[56] References Cited

U.S. PATENT DOCUMENTS

| | | | |
|---|---|---|---|
| 4,064,410 | 12/1977 | Roach | 310/211 |
| 4,363,988 | 12/1982 | Kliman | 310/268 |
| 5,028,830 | 7/1991 | Mas | 310/211 |
| 5,208,503 | 5/1993 | Hisey | 310/259 |
| 5,488,984 | 2/1996 | Fahy | 164/91 |
| 5,512,792 | 4/1996 | Bawin et al. | 310/262 |
| 5,543,187 | 8/1996 | Errico et al. | 428/34.6 |
| 5,572,080 | 11/1996 | Nakamura et al. | 310/211 |
| 5,610,465 | 3/1997 | Sakamoto et al. | 310/211 |
| 5,642,010 | 6/1997 | Carosa et al. | 310/211 |
| 5,670,838 | 9/1997 | Everton | 310/254 |
| 5,903,082 | 5/1999 | Caamano | 310/254 |

FOREIGN PATENT DOCUMENTS

| | | |
|---|---|---|
| 404165945A | 6/1992 | Japan . |
| 1281348 | 7/1972 | United Kingdom . |
| 1292111 | 10/1972 | United Kingdom . |

OTHER PUBLICATIONS

M. Ito et al., "Magnetically Anisotropic Solid Rotor of an Induction Motor", IEEE Transactions on Energy Conversion, vol. 3, No. 2, Jun. 1988, pp. 427–432.

German Technical Journal: Elektrische Maschinen, 1984, pp. 352–356.

German Technical Journal: "E und M", No. 9 for 1980, pp. 378–385.

*Primary Examiner*—Thomas M. Dougherty
*Assistant Examiner*—Joseph Waks
*Attorney, Agent, or Firm*—Rosenthal & Osha LLP

[57] ABSTRACT

A squirrel cage rotor includes a cage, lamination sheets provided with a plurality of slots, and short circuit rings arranged at the axial ends of said lamination sheets and connected by short circuit rods disposed within said slots. In one aspect, said lamination sheets comprise sheets made of an amorphous magnetic material, especially of an amorphous metal with high saturation magnetization. In another aspect, said slots are formed with a convex base portion. In a further aspect, said short circuit rings are made of a metal matrix composite material with high electrical conductivity, preferably of a fiber reinforced aluminum matrix composite material.

18 Claims, 2 Drawing Sheets

SQUIRREL CAGE ROTOR

FIELD OF THE INVENTION

The present invention relates to a squirrel cage rotor, particularly to a squirrel cage rotor comprising a cage, a stack of lamination sheets provided with a plurality of slots, and short circuit rings arranged at the axial ends of said stack of lamination sheets and connected by short circuit rods disposed within said plurality of slots.

BACKGROUND OF THE INVENTION

In conventional squirrel cage rotors of the above type, the centrifugal forces leads to a large strain of the rotor at high rotational speeds. The maximum attainable speed is limited by a deformation of one or several of the rotor elements or, in extreme cases, by the destruction of the motor. Rotating at high speed, the rotor is storing a considerable amount of rotational energy which may case serious damage in the vicinity of the motor in case of a malfunction.

It is known to use additional elements to protect the short circuit rings against the centrifugal forces acting on them. In document DE-C-42 22 187, the short circuit rings are safe-guarded by additional holding means disposed at the stack of lamination sheets. The holding means are provided at the axial end sheets and engage corresponding recesses provided in the short circuit rings.

Using a solid iron rotor allows high speed rotation due to its high stability, but the maximum rotational thrust, i.e. the force per unit area in the air gap turns out to be unacceptably low. Moreover, the large specific losses make sufficient cooling virtually impossible.

SUMMARY OF THE INVENTION

The present invention intends to overcome the above-mentioned drawbacks and disadvantages of the prior art. Specifically, the invention intends to provide a squirrel cage rotor which can be operated at high speed without being deformed or destroyed by the centrifugal forces acting thereon. It is another object of the invention to further provide a squirrel cage rotor with a large torque.

To achieve the above-mentioned objects, in accordance with the present invention, there is provided a squirrel cage rotor according to claim 1, a high-frequency rotor according to claim 7, and a rotor for a high-frequency motor of claim 13.

In a first aspect, a squirrel cage rotor comprising a cage, a stack of lamination sheets provided with a plurality of slots, and short circuit rings arranged at the axial ends of said stack of lamination sheets and connected by short circuit rods disposed within said plurality of slots, wherein said stack of lamination sheets comprises sheets made of an amorphous magnetic material, especially of an amorphous metal with high saturation magnetization.

Because of their small hysteresis losses at high frequencies, amorphous magnetic materials are used, for example, in power transformers in switch-mode power supply units. It has now surprisingly been found by the present inventors that these amorphous magnetic materials furthermore show an extraordinary large mechanical strength. Because of this large mechanical strength, the rotor speed can be significantly increased when using a stack of lamination sheets made of an amorphous magnetic material. Unlike the usual case, the known soft magnetic properties of amorphous materials are not important in the present invention, because hysteresis losses in the rotor can be held low using conventional laminations even for high speed motors due to the small slip frequency.

Advantageously, the amorphous magnetic material used has a high saturation magnetization. A useful saturation magnetization is not below than 1 tesla (T), preferably it is above 1.4 T, more preferable it is above 1.6 T. A high saturation magnetization results in rotational thrusts comparable to conventional machines while at the same time allowing a significantly increased speed. This leads to a significant increase of the maximum power density attainable.

Boron-iron-alloys or boron-iron-silicon-alloys may, for example, be used as amorphous metals. In these alloys, iron may be supplemented or at least partially replaced by nickel or cobalt. In contrast to the usual treatment, the amorphous metal is not annealed in an oriented field to obtain uniform magnetic properties. Rather, the annealing process is advantageously omitted, thereby avoiding the embrittlement usually connected with the annealing process.

As an additional advantage of the amorphous materials, the magnetic losses arising from eddy currents and hysteresis losses in the magnetic material are kept small because of their soft magnetic properties and the large specific resistivity due to their amorphous structure. This leads to a reduction of the heating of the electromotor at high rotational speeds.

Hysteresis losses and eddy currents can further be kept small by using sheets of a small thickness. Conventional sheets are typically 0.5 mm thick and are electrically isolated from each other by a coating of lacquer. The present inventors have now found that the lamination sheets advantageously have a thickness of less then 50 microns, preferably of about 20 microns. Without being bound to a particular theory, it is presently assumed that a native oxide layer at the surface of the sheets isolates the sheets from each other electrically. The small sheet thickness offers as a further advantage that possible cracks due to a large strain can spread only very little. Instead, the cracks are restricted to a limited area by the plurality of lamination sheets.

In a further aspect of the invention, a high-frequency rotor is provided, comprising a squirrel cage, a plurality of lamination sheets provided with a plurality of through holes extending axially between axial ends of said plurality of lamination sheets, and end rings arranged at said axial ends of said plurality of lamination sheets and connected by short circuit rods disposed within said plurality of through holes, wherein each of said through holes is shaped with a convex base.

This aspect of the invention is based on the idea that in the material the maximum strain along the circumference of the through holes is given by the peak strain at the base of the through holes, and that a convex shape of the base leads to a substantially uniform distribution of the strain induced by centrifugal forces across the entire base portion of the through holes. This allows an increase of the maximum rotational speed.

It is particularly favorable if the radius of curvature R of each convex base portion is substantially equal to the distance between the base portion of this through hole and the central axis of the plurality of lamination sheets. In this case, the radial distance between the inner boundary of the plurality of lamination sheets and the bases of the through holes is constant along each convex base profile.

High mechanical stability can be obtained with through holes which are closed on their air gap side. However, it is preferred if the through holes are provided with slits.

Through holes which are open on the air gap side allow a considerably higher torque without reducing the solidity to unacceptably low values.

In a further aspect of the invention, a rotor for a high-frequency motor is provided, comprising a squirrel cage, a laminated core provided with a plurality of through bores, two end rings arranged at axial ends of said laminated core, and electrically conductive rods disposed within said through bores and connecting said end rings, wherein said end rings are made of a highly conductive metal matrix composite material.

The properties of the composite material can be adjusted to high centrifugal strain. It is particularly favorable to use fiber reinforced aluminum alloys which offer high tensile strength, a large value of Young's modulus and high resistance to wear at relatively low production costs. Using short-fiber reinforced aluminum alloys can be especially advantageous.

Beneficially, the electrically conductive rods are made of aluminum, since then the rods are light-weight due to the small specific density of aluminum and at the same time they have sufficiently high electrical conductivity.

A particularly large increase of the maximum speed at high torque arises from possible combinations of two or more of the above mentioned measures. The increase is particularly large for such a combination, since the maximum speed is always limited by the weakest element.

The use of an amorphous magnetic material imparts high mechanical stability to the stack of lamination sheets. The use of a metal matrix composite material for the short circuit rings raises their mechanical stability. Both measures result in a larger maximum rotational speed. The specific shape of the through holes described above also allows higher speeds. A large torque arises due to the high saturation magnetization of the stack of lamination sheets, due to the silted through holes. The above remarks imply that the above-mentioned measures need not be applied all together to achieve the objects of the invention.

BRIEF DESCRIPTION OF THE DRAWINGS

The foregoing and the other objects, features and advantages of the invention will be described with relation to the embodiments shown in the accompanying drawings, in which.

In the figures, like reference numerals refer to like elements.

DESCRIPTION OF THE PREFERRED EMBODIMENTS

Figure 1:
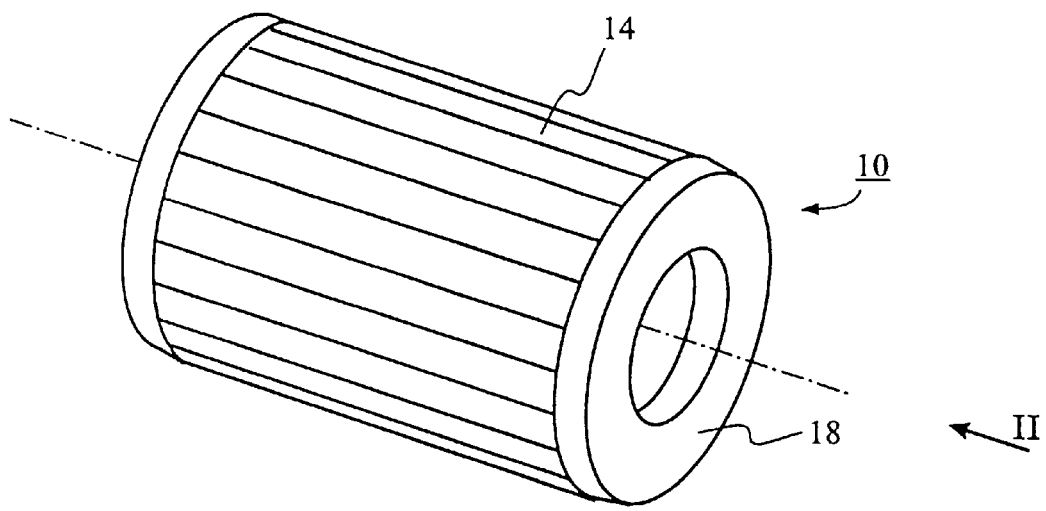
FIG. 1 is a perspective view of a squirrel cage rotor with a cage and a stack of lamination sheets.
Figure 2:
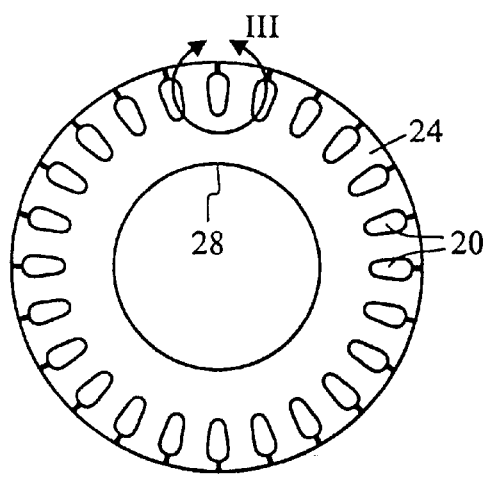
FIG. 2 is a cross-sectional view of a prior art squirrel cage rotor in the region of the lamination sheets, shown from direction II of FIG. 1.

Referring to the drawings, FIG. 1 shows a perspective view of a squirrel cage rotor 10. Short circuit rings 18 are arranged at axial ends of the stack of lamination sheets 14. Disposed below the opening slits 16 are slots 20 which contain the short circuit rods. The short circuit rods together with the short circuit rings 18 form the squirrel cage. The stack of lamination sheets 14 consists of individual sheets 24 pressed against each other (FIG. 2).

Figure 3:
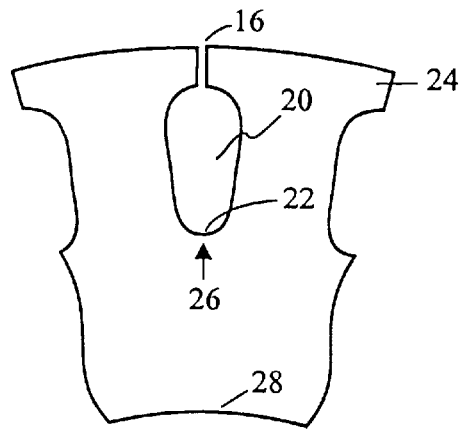
FIG. 3 is an enlarged view of FIG. 2.
Figure 4:
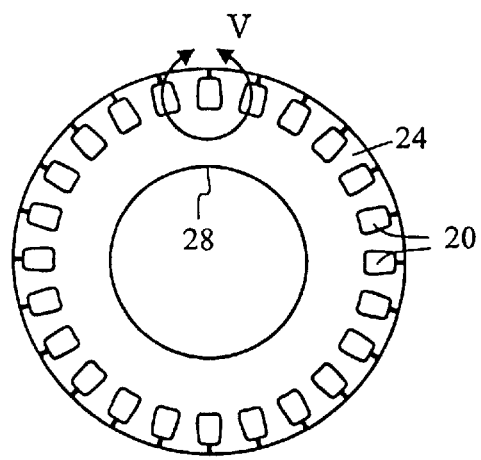
FIG. 4 is a cross-sectional view as in FIG. 2 for a squirrel cage rotor according to an embodiment of the invention.
Figure 5:
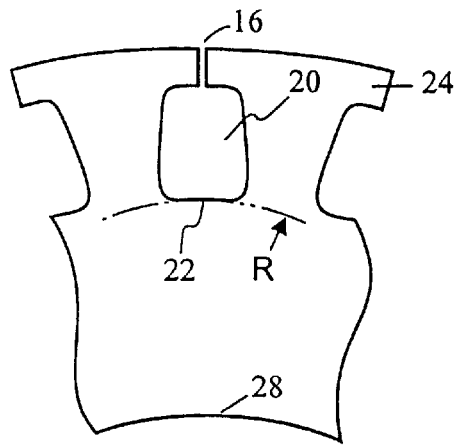
FIG. 5 is an enlarged view of FIG. 4.

In conventional squirrel cage rotors the slots 20 are typically formed with a shape as shown in detail in FIG. 3. It has been found by the present inventors that the concave shape of the base portion 22 of the slots 20 leads at high rotational speeds of the rotor to particularly large tensile strain in the center of the base portion (reference sign 26) due to the centrifugal forces. Because of the curvature of the inner boundary 28 of the sheets, this is also true if the base portion has the form of a straight line. Thus, the peek stain at the center of the base of the slots limits the maximum rotational speed attainable. The convex shape of the base according to the invention results in a uniform distribution of the centrifugal strain along the entire base portion of the slots (FIGS. 4 and 5). To achieve the same slot area as in a design according to FIG. 3, the cross section of the slots is generally widened and shortened. The reduced peek strain accompanying the convex shape results in a significantly increased admissible speed of the rotor. The silted form of the slots increases the attainable torque.

The short circuit rings are cast from fiber reinforced aluminum. A fiber fraction of 15 to 25 percent has been found advantageous. The fiber material imparts a significantly increased mechanical strength and rigidity to the short circuit rings, while the use of aluminum leads to a sufficiently large electrical conductivity of the composite material. In the preferred embodiment, the short circuit rods are made of aluminum. The aluminum rods have on one hand a sufficiently large conductivity and on the other hand a significantly smaller mass when compared to copper or silver rods. At high rotational speeds, short circuit rods made of copper or silver would press the slits 16 open and thereby burst the stack of lamination sheets 14.

The stack of lamination sheets 14 consists of thin sheets 24 of an amorphous metal with a high saturation magnetization. In the preferred embodiment, a boron-(iron, cobalt)-silicon alloy has been used. This alloy has a saturation magnetization of 1.74 tesla. The amorphous magnetic materials further show an extraordinary large tensile strength.

The known soft magnetic properties of the amorphous materials are not of crucial importance in the present invention. However, the resulting low magnetic losses offer an additional advantage.

Since the maximum cooling capacity for a given motor volume is limited, it is further important that the temperature increase of the rotor due to electric and magnetic losses does not become too large. In the preferred embodiment, the short circuit rods have been fabricated from aluminum, which implies larger electrical losses when compared to copper or silver rods. On the other hand, aluminum rods provide a more favorable ratio of electrical conductivity to weight.

The magnetic losses are further reduced since the individual lamination sheets consist of layers of amorphous metal which have a thickness of only about 20 microns. Moreover, the use of thin laminations increases the resistance of the stack of lamination sheets against the spread of possible cracks.

Altogether, the present inventors have found that each of the measures described above leads to a distinct increase of the maximum rotational speed and the torque, respectively. The increase is particularly large, if two or more of these measures are combined with each other.

Whereas the invention has been described with respect to preferred embodiments thereof, it will be apparent that variations may be made therein, all without departing from the spirit and scope of the invention. The following claims are thus intended to be understood as a first non-limiting approach to define the invention in general terms.

What is claimed is:

1. A squirrel cage rotor comprising a cage, a stack of lamination sheets positioned perpendicularly to an axis of the rotor, the plurality of said lamination sheets provided with a plurality of slots, and short circuit rings arranged at axial ends of said stack of lamination sheets and connected by short circuit rods disposed within said plurality of slots, wherein said stack of lamination sheets comprises sheets made of an amorphous magnetic material, especially of an amorphous metal with high saturation magnetization.

2. A squirrel cage rotor according to claim 1, wherein said sheets made of an amorphous magnetic material have a thickness of less than 50 microns, preferably of about 20 microns.

3. A squirrel cage rotor according to claim 1, wherein said short circuit rings are made of a metal matrix composite material with high electrical conductivity, preferably of a fiber reinforced aluminum matrix composite material.

4. A squirrel cage rotor according to claim 1, wherein said short circuit rods consist of aluminum.

5. A squirrel cage rotor according to claim 1, in which said slots are formed with a convex base portion.

6. A squirrel cage rotor according to claim 5, wherein a radius of curvature of said convex base portion is substantially equal to a distance between the convex base portion and a central axis of said lamination sheets.

7. A high-frequency rotor comprising a squirrel cage, a plurality of lamination sheets positioned perpendicularly to an axis of the rotor, the plurality of said lamination sheets provided with a plurality of through holes extending axially between axial ends of said plurality of lamination sheets, and end rings arranged at said axial ends of said plurality of lamination sheets and connected by short circuit rods disposed within said plurality of through holes, wherein each of said through holes is shaped with a convex base.

8. A high-frequency rotor according to claim 7, wherein a radius of curvature of each said convex base is substantially equal to a distance between said base of said through holes and a central axis of said plurality of lamination sheets.

9. A high-frequency rotor according to claim 7, wherein said end rings comprise a metal matrix composite material with high electrical conductivity, preferably of a fiber reinforced aluminum matrix composite material.

10. A high-frequency rotor according to claim 7, wherein said short circuit rods are made of aluminum.

11. A high-frequency rotor according to claim 7, wherein said plurality of lamination sheets comprises sheets made of an amorphous magnetic material, especially of an amorphous metal with high saturation magnetization.

12. A high-frequency rotor according to claim 11, wherein said sheets made of an amorphous magnetic material have a thickness of less than 50 microns, preferably of about 20 microns.

13. A rotor for a high-frequency motor comprising a squirrel cage, a laminated core provided with a plurality of through bores, two end rings arranged at axial ends of said laminated core, and electrically conductive rods disposed within said through bores and connecting said end rings, wherein said end rings are made of a highly conductive metal matrix composite material, preferably of a fiber reinforced aluminum matrix composite material.

14. A rotor for a high-frequency motor according to claim 13, wherein said electrically conductive rods are made of aluminum.

15. A rotor for a high-frequency motor according to claim 13, wherein said laminated core comprises laminations made of an amorphous magnetic material, especially of an amorphous metal with high saturation magnetization.

16. A rotor for a high-frequency motor according to claim 15, wherein said laminations made of an amorphous magnetic material have a thickness of less than 50 microns, preferably of about 20 microns.

17. A rotor for a high-frequency motor according to claim 13, wherein each of said through bores has a convex base.

18. A rotor for a high-frequency motor according to claim 13, wherein a radius of curvature of each said convex base is substantially equal to a distance between said convex base of said through bores and a central axis of said laminated core.

* * * * *